United States Patent [19]
Lagarde

[11] 3,956,722
[45] May 11, 1976

[54] EDDY CURRENT RETARDER CONTROL DEVICE

[75] Inventor: Roger Lagarde, Aulnay-sous-Bois, France

[73] Assignee: Labavia-S.G.E., France

[22] Filed: Nov. 21, 1974

[21] Appl. No.: 525,811

[30] Foreign Application Priority Data
Nov. 21, 1973 France .............................. 73.41412
Apr. 16, 1974 France .............................. 74.13215

[52] U.S. Cl. ............................... 335/103; 335/136; 335/266
[51] Int. Cl.² ......................................... H01H 51/30
[58] Field of Search ............... 335/63, 70, 100, 103, 335/128, 132, 136, 177, 202, 266, 267, 268, 276, 278

[56] References Cited
UNITED STATES PATENTS

| | | | |
|---|---|---|---|
| 2,149,699 | 3/1939 | James et al. ........................ | 335/136 |
| 3,032,627 | 5/1962 | Ronk .............................. | 335/276 X |
| 3,099,729 | 7/1963 | Leo ..................................... | 335/128 |

*Primary Examiner*—G. Harris
*Attorney, Agent, or Firm*—Stevens, Davis, Miller & Mosher

[57] ABSTRACT

A control device for an eddy current retarder having a plurality of energizing windings comprises an insulating support carrying a plurality of connecting terminals for connection to the retarder windings and a junction terminal for connection to one pole of a power supply. A plurality of contactors are provided for controlling the energizing of the retarder windings, each contactor corresponding to a connecting terminal and comprising first and second fixed contact members, a bridge contact co-operating with the first and second fixed contact members, and a pull-on contactor winding controlling the bridge contact. A first contact plate connects the first contact member of each contactor to the corresponding connecting terminal and a second common contact plate connects the second contact members of the contactors to the junction terminal. Each contactor winding is connected to a respective control terminal which is connected to a control selector for consecutively energizing the control terminals. The insulating support has a raised platform disposed between two oppositely directed flanges which extend parallel to the platform and are downwardly offset therefrom. The contactor windings are topped by their bridge contacts and are carried on the flanges, while the fixed contact members of the contactors and the contact elements are mounted directly on the platform.

17 Claims, 9 Drawing Figures

EDDY CURRENT RETARDER CONTROL DEVICE

BACKGROUND OF THE INVENTION

This invention relates to a control device for an eddy current retarder having a number of energizing windings, the device having a number of electrical contactors adapted to provide sequential control of the energization of as many windings or groups thereof in the retarder as there are contactors.

The invention relates more particularly to such a control device which comprises: an insulating support; a plurality of connecting terminals mounted on said support for connection to respective retarder windings; a junction terminal mounted on said support for connection to one pole of a power supply; a plurality of contactors corresponding to said connecting terminals; each said contactor comprising first and second fixed contact members, a bridge contact co-operating with said first and second fixed contact members, and a pull-on contactor winding controlling said bridge contact; a first contact element to which said first fixed contact member is secured and which is connected to the corresponding connecting terminal; a second contact element to which said second fixed contact member is secured and which is connected to the said junction terminal; and a plurality of control terminals each connected to a corresponding contactor winding and for connection to a control selector for consecutively energizing said control terminals.

In known forms of such control devices, such as that described inter alia in the Applicants' Certificate of Addition FRANCE No. 70.46639 filed on Dec. 24 1970, with reference to FIG. 2 thereof, the insulating support or base has the general shape of a horizontal plate carrying three parallel rows of elements, viz. a row of contactor windings topped by their associated bridge contacts, a row of insulating fittings or mountings topped by fixed contact members adapted to cooperate with the bridge contacts and a row of terminals which extend over the whole width of the base near one of its edges.

By way of flat wiring below the base or support, the terminals are connected to the respective winding ends and to the fixed contact members and have connected to them flexes enabling all the contactors to be connected to the outside circuits by which they are controlled and which they control.

The unit embodied by the support or base member and the various elements thereon is received in a protective casing or box which has a removable cover, a chamber in the box between the bottom thereof and the support member being reserved for special components of the contactor control and protection circuits.

A known device of this kind has a number of disadvantages, more particularly the following:

The device occupies a considerable height, for the relatively high contactor windings take up only some of the support, so that space is wasted above the terminal row.

The space available below the support to receive the control and protection circuits is very low and therefore difficult of access.

The height of the windings means that the insulating mountings or fittings, which carry the fixed contact members so that the same are offered up opposite to the bridge contacts, must themselves be relatively high, so that it is difficult to position the supported fixed contact members accurately even though the mountings may be very rigid and firmly fixed to the support.

The presence of the insulated mountings leads to the existence of a relatively large distance and a relatively large number of items between each fixed contact member and the terminal corresponding thereto, with the possible result of unsatisfactory voltage drops.

Because of the extent of the terminal row and of its nearness to the support edge, the conductors connecting such terminals to the outside are virtually impossible to group together before leaving the casing in bunches which can extend through lead-outs or glands in the casing or which are suitable for making a simple and reliable connection by multiple-pin connectors.

SUMMARY OF THE INVENTION

The control device construction provided by the invention aims to obviate at least some of the above disadvantages.

Accordingly, in a control device according to the invention, the insulating support has a raised platform and a flange which is disposed parallel to the platform and is downwardly offset therefrom, the contactor winding of at least one of the contactors being topped by the corresponding bridge contact and being carried on the flange, the corresponding fixed contacts and the contact elements being mounted directly on the platform.

Advantageously, said insulating support comprises an integrally formed skirt interconnecting said platform and said flange, said skirt being perpendicular to both said platform and said flange.

Preferably, said insulating support has a centrally disposed platform and two oppositely extending flanges disposed on opposite sides of said platform.

In one such embodiment of the invention, control circuits are connected to said control terminals, said insulating support comprising an integrally formed skirt interconnecting said platform and each said flange, said control circuits comprising electronic components received in a space defined below said platform between said skirts.

Advantageously, said platform is T-shaped and has a substantially rectangular elongated portion which is perpendicular to the sides of the platform connected to the flanges and which forms the dash of the T, and some of said electronic components are received below said elongated portion of said platform.

Said second contact element may comprise a common conductive plate carrying said second fixed contact member of each said contactor and connected to said junction terminal. In one embodiment of this kind, four contactors are provided and said common conductive plate is H-shaped, the first fixed contact members of two of said contactors being disposed with the corresponding connecting terminals between the arms of the H one of each side of the dash of the H. In another embodiment having four contactors, said common conductive plate is of elongated rectangular shape, the minor sides of said common conductive plate being parallel to the sides of said platform connected to said flanges, two of said first contact elements flanking each major side of said common conductive plate.

According to a preferred feature, said connecting terminals are disposed on the same surface of said platform as said first and second fixed contact members of said contactors, said first contact element comprising a conductive connecting plate connecting said first fixed contact member of each said contactor to the corresponding connecting terminal.

According to another preferred feature at least one of said conductive plates connecting said first and second fixed contacts to said junction and connecting terminals includes a narrow conductive portion serving as a fuse.

In one particularly advantageous embodiment of the invention, there is provided an insulating protective plate spaced apart from said platform and extending parallel to said platform over at least a major portion thereof, said junction and connecting terminals extending from said platform through said insulating protective plate. If desired, the surface of said insulating plate from which said connecting and junction terminals extend presents separating ribs for guiding wires connecting said connecting and junction terminals to the retarder winding and to the one pole of the power supply respectively. Further, a limit stop may be provided for limiting the movement of said bridge contact of each said contactor, said limit stop being rigidly secured to said insulating protective plate.

In an embodiment of the invention comprising a control circuit connected to each said control terminal, said control circuit may be received below said platform of said insulating support and be connected to the contactor winding of the corresponding contactor through an aperture in said flange of said insulating support.

The platform may have a fixed multiple connector element whose contacts are the connecting terminals and are adapted to cooperate with the contacts on a movable connector part connected to the control selector.

In a control device for which the insulated support and all the elements carried thereby are received in a casing, one of the walls of said casing may be formed with a lead-out for a multi-core cable connecting some of the terminals to outside control or operating elements.

BRIEF DESCRIPTION OF THE DRAWINGS

In order that the invention may be readily understood, embodiments thereof will now be described, by way of example, with reference to the appended drawings, in which:

FIG. 5 is a general electrical circuit diagram for the control device and for the windings whose energization the device is adated to control;

DESCRIPTION OF PREFERRED EMBODIMENTS

Figure 1:
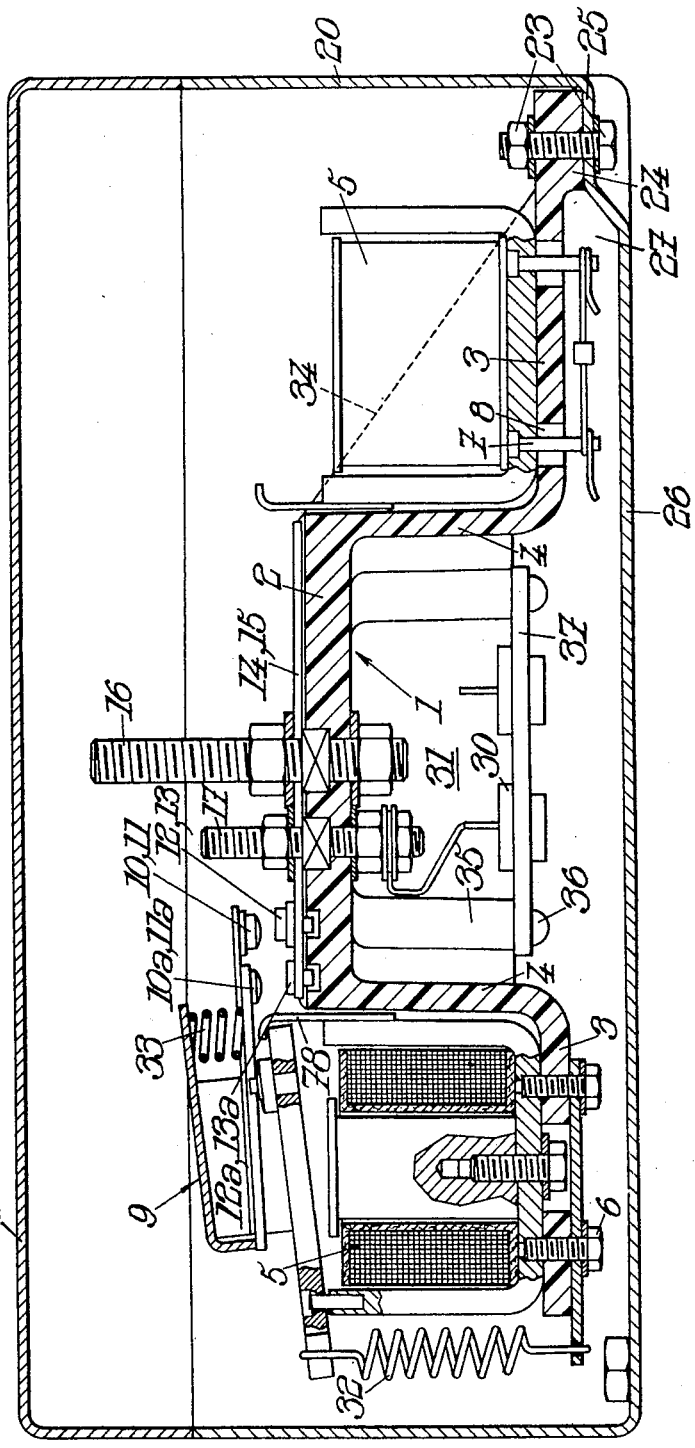
FIG. 1 is a vertical section, on the line I—I of FIG. 2, of a complete system of contactors and their associated elements as embodied by a four-contactor control device according to the invention.
Figure 2:
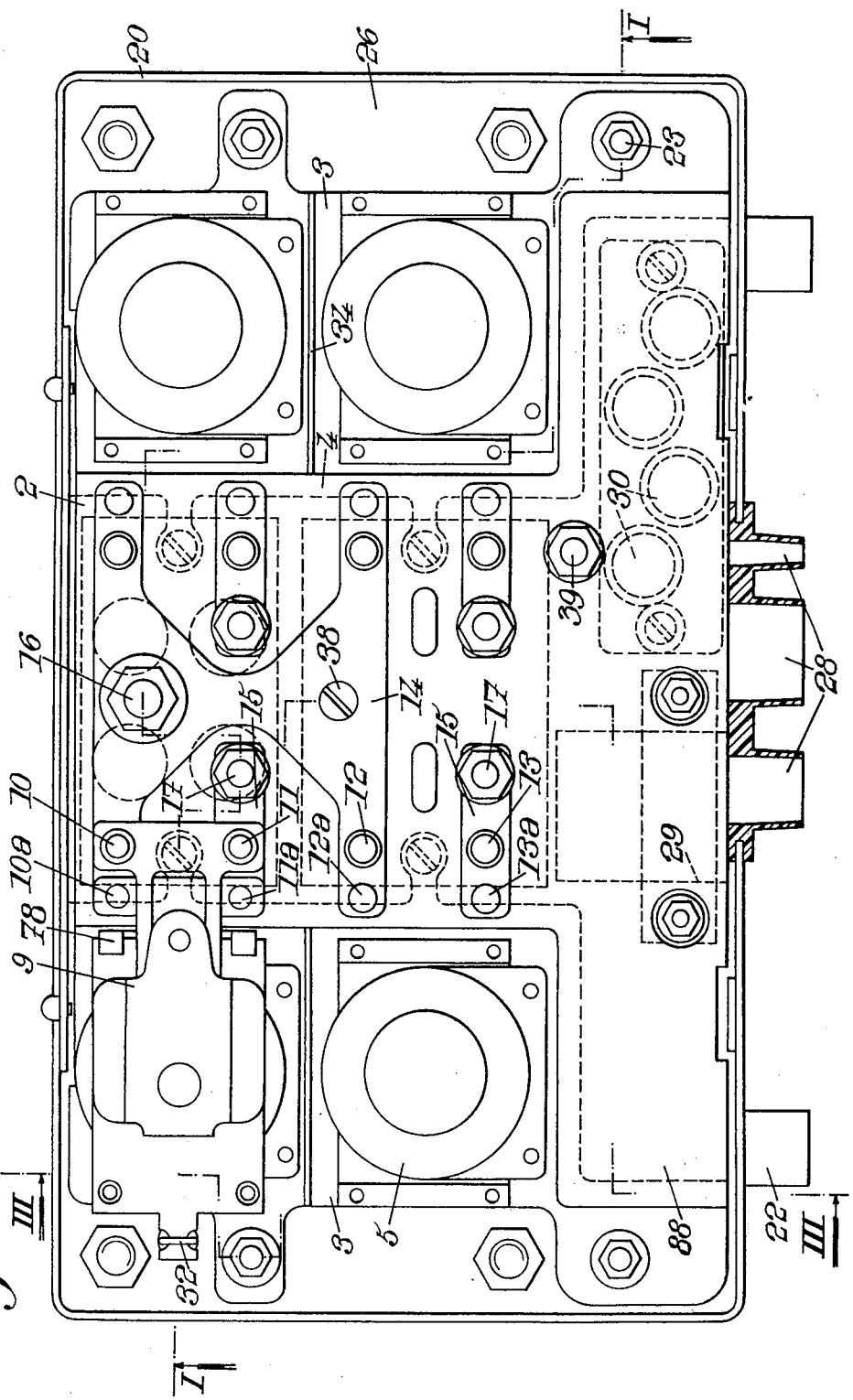
FIG. 2 is a plan view of the control device with its cover removed.
Figure 3:
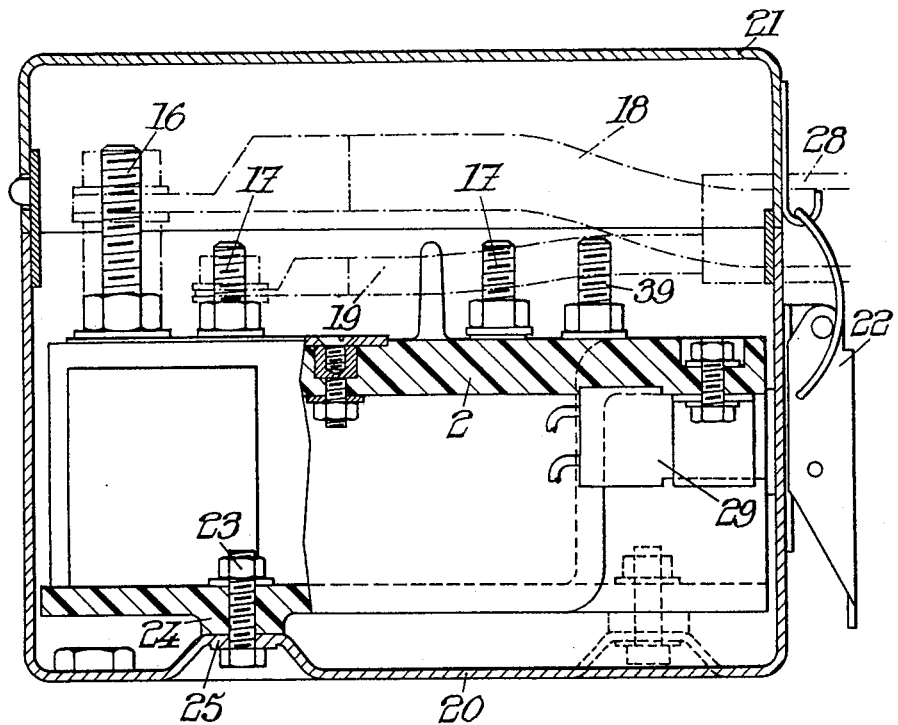
FIG. 3 is a vertical section on the line III—III of FIG. 2.
Figure 4:
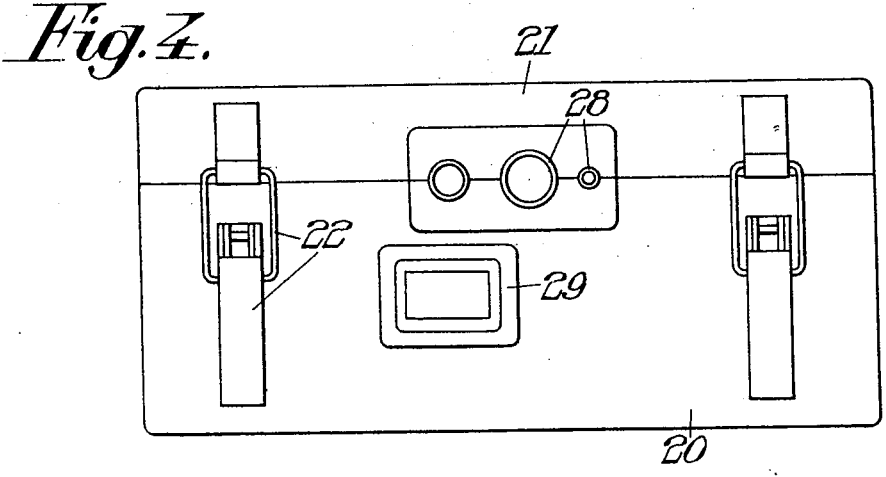
FIG. 4 is an outside end view of a casing of the control device.
Figure 6:
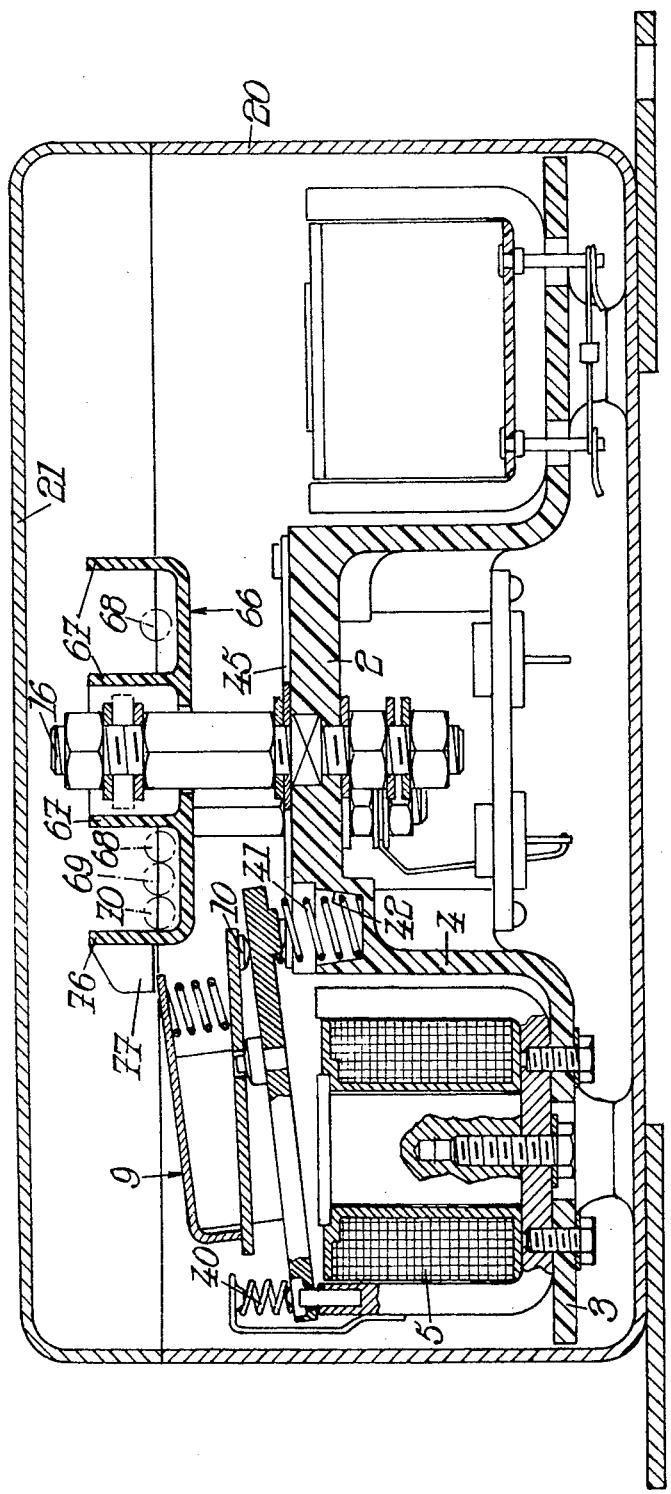
FIGS. 6, 7 and 8 are respectively a view in vertical section on the line VI—VI of FIG. 7, a plan view with the cover removed, and a vertical section on the line VIII—VIII of FIGS. 7 and 9 with portions removed, showing all the contactors and associated elements of another four-contactor control device embodying the invention.

The control device shown in FIGS. 1 to 3 is disposed on an insulated support or base member 1 which in general shape is a solid plate shaped to resemble a flattened capital omega - i.e., having a raised horizontal central platform 2 and two opposite lateral and also horizontal flanges 3 offset downwardly from platform 2 and connected thereto by two vertical portions or skirts 4.

Of course, terms such as "horizontal", "vertical", "above" and the like are used herein only by way of example to clarify the explanation and the choice of such terms is not intended to be limiting or to define the orientation of the device in any way when it is in actual operation. In operation the base member 1 and therefore all the elements disposed thereon can be given any desirable orientation as well as the one which has been taken to simplify the description.

Advantageously, the base member 1 is embodied by a monolithic casting of a rigid insulating material such as glass reinforced nylon. Each of the two flanges 3 carries two contactor windings 5 disposed one beside another and parallel to the skirt 4. Each winding 5 is secured to its flange 3 mechanically by means of screws 6 which extend through appropriate apertures in the flange 3 and the electrical connection of each winding to its control circuit is by way of pins 7 which extend through apertures 8 in flange 3. Each winding 5 is topped by a known movable bridge system 9 carrying a pair of movable contact members 10, 11 which overhang the central platform 2. Disposed immediately below members 10, 11 is a pair of fixed contact members 12, 13 adapted to cooperate with the movable members 10, 11.

The height of the vertical skirts 4 is such that the fixed contact members 12, 13 can be carried directly by the platform 2 or more accurately can be carried thereby just with the interposition of a contact element in the form of a respective conductive plate 14, 15 which is directly applied to the platform 2. The fixed contact members 12, 13 are respectively connected by way of the plates 14, 15 to a single fixed junction terminal 16 and to as many connecting terminals 17 as there are fixed contact members 13. The terminals 16, 17 are secured to platform 2, inter alia by means of a screwed connection; advantageously, such terminals take the form of screwthreaded spindles or studs or the like which are made of a conductive material and which cooperate with appropriate conductive nuts and washers. Terminal 16 is connected to one pole - as a rule, the positive pole - of an external power supply by way of a cable 18 which can be seen in FIG. 3. Terminals 17 are each connected to a respective one of the various retarder windings to be controlled, by way of conductors 19 which can readily be combined to form a single cable thanks to the position of the terminals 17, all of which are disposed on the central platform.

To make clear the respective functions of the various contacts and conductive elements hereinbefore mentioned, they have been transferred to the general circuit diagram of FIG. 5 which is for an embodiment of the control device for use in a four-winding eddy current retarder. In addition to the elements hereinbefore referred to and having the references 5 and 10 to 19, FIG. 5 shows a four-position control selector switch 80 adapted to connect the four contactor windings 5 consecutively to a d.c. power supply 81, and four retarder windings 82 each connected to a d.c. power supply 83 by a circuit of which a portion (18, 16, 15, 13, 11, 10, 12, 14, 17, 19) is open or closed in dependence upon the energization of the associated contactor.

In the embodiment shown in FIGS. 1 to 4, the contact element embodied by the plate 14 corresponding to the fixed contact members 12 secured to the junction terminal 16 is common to all such contact members and has the general shape of a H carrying the terminal 16. The position thereof on the H corresponds substantially to the zone where the dash of the H joins one of its two strokes and such zone is widened accordingly. In this case - the one shown in FIG. 2 - the zone where the dash of the H meets the other stroke thereof is widened similarly and receives a screw 38 for securing the particular plate 14 concerned to the platform 2. As for the systems each embodied by a contact element 15, a corresponding fixed contact member 13 and the associated terminal 17, two of them are disposed between the dashes of the H on either side of the center thereof and the other two are disposed outside the H.

The support or base member 1 with the elements on it is secured in a protective metal box or casing 20 having a releasable cover 21 closable by means of members 22. Advantageously, fixing is by means of bolt and nut systems 23 which are screwed into thickened zones 24 at the bottom of the flanges 3 against projecting bearing surfces 25 formed in the bottom 26 of the box, thus ensuring that the bolt heads do not project beyond the box bottom 26 and sufficient space 27 is left between the flanges 3 and the box bottom 26.

One end wall of the box has a lead-through 28 for the passage of cables 18, 19 and similar cables (including an earth conductor) and comprises an access window for a fixed part 29 of a multiway connector, the part 29 being carried by the platform and being permanently connected to the various elements of the contactor control circuits on the support 1 (the multiway connector replaces the connecting terminals hereinbefore referred to at least to some extent). These items and other relatively bulky and fragile items, e.g. contactor protection diodes 30, are received in box 20 below support member 1 and, more particularly, in compartment 31 which is fairly spacious and readily accessible and which is disposed below the central platform 2 between the skirts 4.

FIGS. 1 and 2 also show the following items: auxiliary contact members 10a, 11a, 12a, 13a which in known manner duplicate the movable and fixed contact members hereinbefore referred to so as to reduce sparking when the circuits are made and broken; tension and compression springs 32, 33 respectively tending to move bridge system 9 away from winding 5 and to move the movable contact members 10, 11 of the system towards the fixed contact members 12, 13; triangular strengthening and separating ribs or webs or the like 34 between the two windings 5 of each flange 3; ribs 35 which extend the skirts 4 towards the inside of compartment 31 and through which vertical screws 36 extend, the same serving to secure below the support 1 plates 37 parallel to the platform 2, inter alia to carry the diodes 30; and a horizontal widening 88 of the platform 2 extending one of those two edges thereof which are not connected to a skirt 4 so as to give the platform 2 the general shape of a T having a wide base and thus increase the space available below the platform.

FIGS. 2 and 3 also show an earth terminal 39 for connecting the control circuits to one side of the power supply 81.

In the second embodiment of the device shown in FIGS. 6 to 9, like elements have the same reference numerals as in the first embodiment just described. Instead of the tension spring 32 of FIG. 1 being used, however, two compression springs 40, 41 are used, the spring 40 keeping the movable bridge system applied at its articulation against the winding yoke and the spring 41 being received in a recess 42 in the central platform 2 to bias the moving system towards separation substantially at the contact members 10. This feature helps to reduce the size of the control device.

The fixed contact members 43, 44 nearest two adjacent contactors are carried on a common contact element 45 in the form of a conductive plate which in general shape resembles an elongated rectangle formed with two central longitudinal slots 46, 47 which start one from each minor side and thus divide the plate into four parallel arms.

By providing a recess 48 in each arm a conductive portion in the form of two thin edge strips 49, 50 is left between each contact member 43, 44 and the common central terminal 16. The cross-section of such conductive part is small enough for it to serve as a fuse protecting the control device against an excess current heavy enough to damage it, for instance, because of a short circuit. Clearly, the length of the slots 46, 47 needs to be just sufficient for the fuses to be contrived by cutting the recesses 48.

Figure 7:
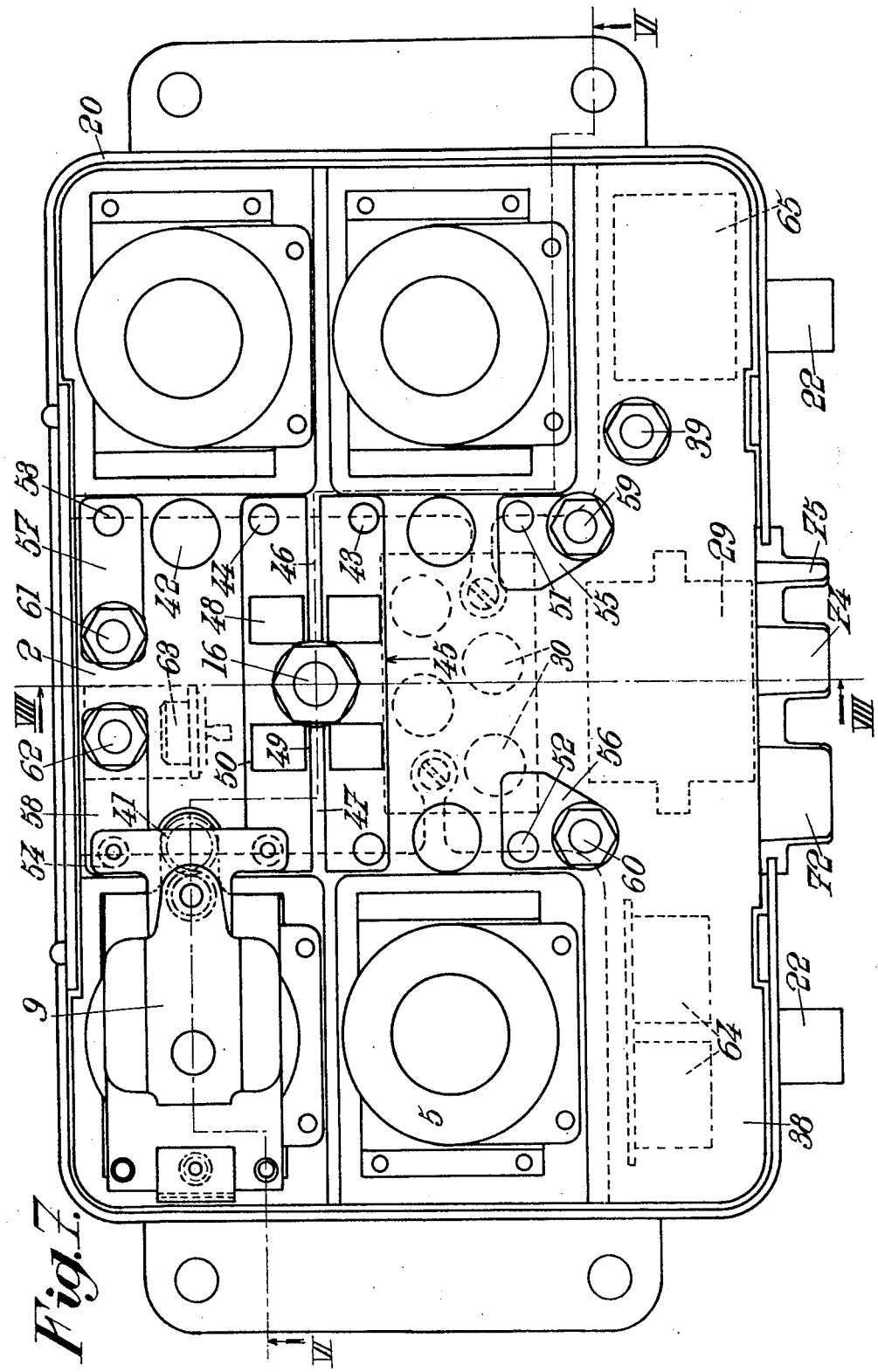

As can be seen in FIG. 7, the four other contact members 51 – 54 and their respective contact elements 55 – 58 connected to the connecting terminals 59 – 62 for connection to the retarder windings are disposed in pairs on either side of the plate 45. Of course, the recesses 48 could also or only be contrived in the plates forming the contact elements 55 – 58 subject to being shaped appropriately.

All the auxiliary control and protection elements such as inter alia those mentioned in French Pat. 1 509 155 of Dec. 1 1966 and the previously mentioned Certificate of Addition thereto No. 70 46639 and in French Patent No. 72 14345 of Apr. 21 1972, are received below the central disc 2 and its extension 38. There can be seen in FIG. 7 the contact circuit protection diodes 30, a stop light diode 63, a delay arrangement 64, the fixed connector portion 29 and an auxiliary 24 – 12 volt relay 65 for stop light control. Except for the connector 29 none of these elements is shown in FIG. 8.

Figure 8:
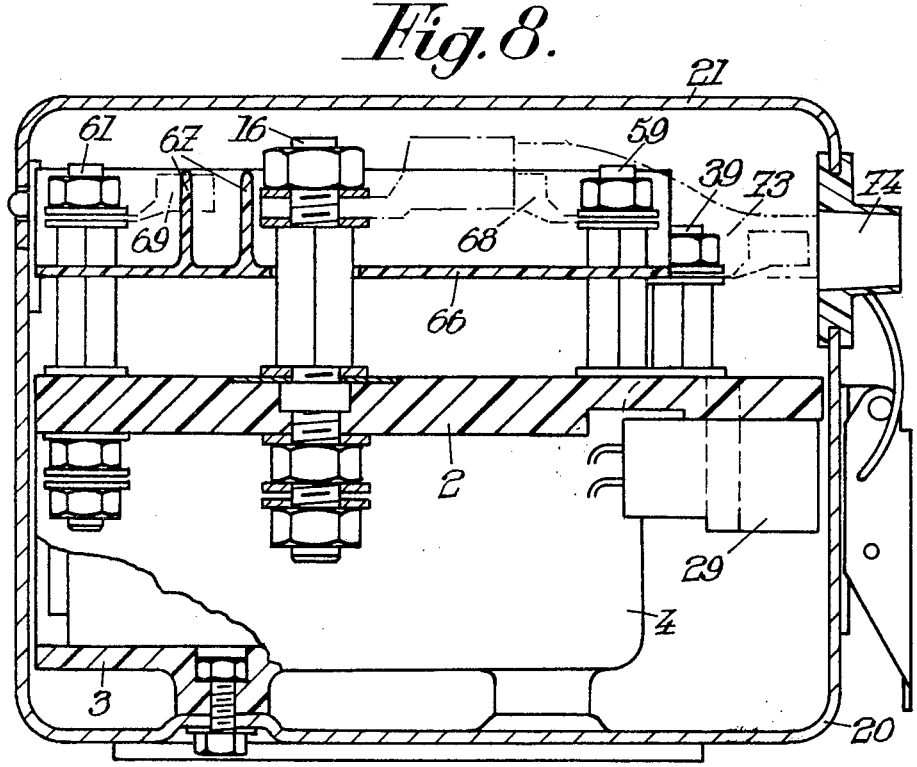
Figure 9:
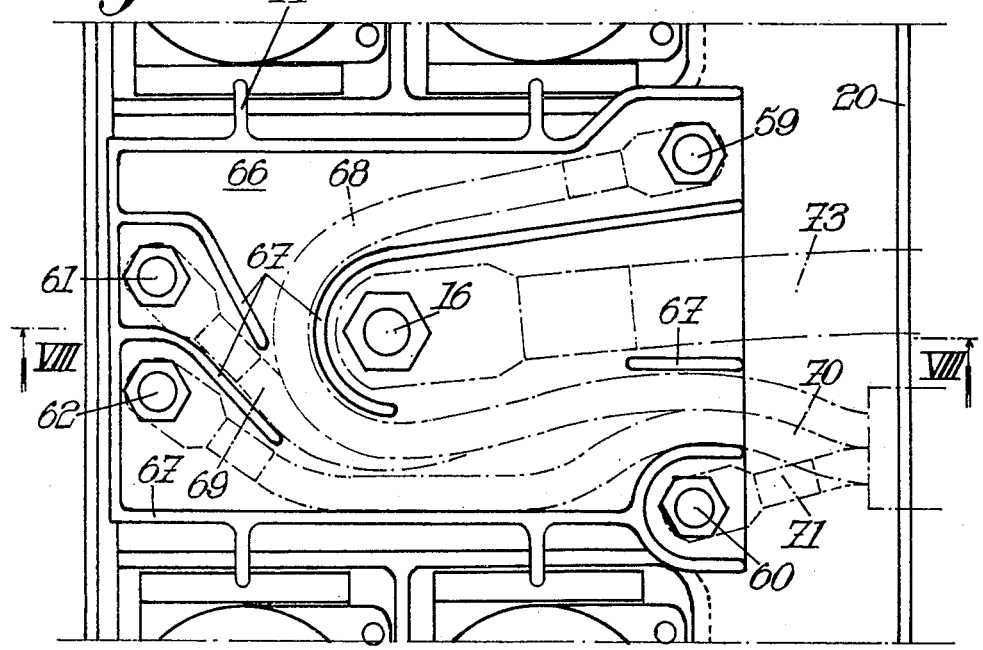
FIG. 9, is a plan view of an insulated protection plate interposed between the disc and the terminal parts of cables connected to the connecting and junction terminals of the second embodiment of the control device.

To protect the fixed and moving contact members and elements and to facilitate the connection of cables to terminals 16 and 59 – 62, the screw-threaded rods embodying such terminals are extended so as to pass through an insulated protection plate 66 which is therefore disposed between the moving systems 9 and the central platform 2 carrying the fixed contact members and elements and between the terminal portions of the rods to which the terminations of the corresponding cables have to be connected (FIGS. 8 and 9). Plate 66 is secured to platform 2 by any appropriate means (not shown), such as columns or embossings moulded in with the platform 2 and retaining the plate 66 by means of screws extending therethrough and screwed into the end of such columns or embossings.

On its top surface the plate 66 has ribs 67 which are moulded therein and which serve to separate and locate the cables. As FIG. 9 shows, the four wires 68 – 71 of a cable which are connected to the retarder winding are guided by the ribs 67 to their respective connecting terminals 59 to 62. The cable is led out of box 20 through lead-out 72 and a junction cable 73 connected to one side of the power supply leaves the box through a lead-out 74. The cable connected to the earth terminal 39 leaves via a lead-out 74 (FIG. 7).

In the embodiments shown in FIGS. 1 to 4, the travel of the movable bridge systems forced apart by the corresponding springs 32 is limited by end stops, in the form of members 78 (FIGS. 1, 2) fitted and secured e.g. to one of the arms of the U-shaped yoke of the contactors; consequently, each end stop has to be manufactured separately and requires a separate assembly operation.

The embodiment shown in FIGS. 6 to 9 obviates this form of production and assembly and therefore helps to reduce the cost of the resulting control device. In such embodiment the end stops are rigidly secured to the insulated plate and are preferably moulded therewith. More particularly, each of edge ribs 76, extending along an edge of the insulated plate 66 near the flanges 3, has small vertical ribs 77 projecting perpendicularly from the rib 76 above a respective moving system 9 so that its bottom end or nose can retain such system against the force of the corresponding spring 41. The integers 66, 67, 76 and all the ribs 77 are a monolithic plastics moulding.

The constructions hereinbefore described have many advantages over the prior art constructions, more particularly the following:

Since better use is made of the various spaces, more particularly because of the relative recessing or "sinking" of the windings on either side of a raised part of the support, the overall size of the device is reduced.

Since the fixed contact elements are mounted directly on the central disc near their respective terminals, all the insulating mountings which they formerly required and their securing and connecting elements can be completely omitted, thus facilitating accurate location of the corresponding fixed contact members relative to the movable contact members and their assembly and providing a considerable saving of material and a reduction of voltage drops between the fixed contact elements and their terminals.

Grouping the terminals in the central part of the support makes it possible to combine the wires serving the device into bunches or groups before they leave the box, thus greatly facilitating the passage of the cables through the box wall (by way of lead-throughs and/or of multiway connectors) and the handling operating operations and connections for the box.

The region of the box where the various items carrying the heavy retarder winding energizing current are disposed is separated by the base from the region of the box in which are disposed the items carrying the low contactor actuation currents and the protection diodes 30 through which no current flows in theory.

The space available below the support for circuit components other than the terminals and connecting wiring carrying heavy current is relatively large and readily accessible.

I claim:

1. A control device for an eddy current retarder having a plurality of energizing windings, comprising:
   an insulating support;
   a plurality of connecting terminals mounted on said support for connection to respective retarder windings;
   a junction terminal mounted on said support for connection to one pole of a power supply;
   a plurality of contactors corresponding to said connecting terminals;
   each said contactor comprising first and second fixed contact members, a bridge contact co-operating with said first and second fixed contact members, and a pull-on contactor winding controlling said bridge contact;
   a first contact element to which said first fixed contact member is secured and which is connected to the corresponding connecting terminal;
   a second contact element to which said second contact member is secured and which is connected to said junction terminal; and
   a plurality of control terminals each connected to a corresponding contactor winding and for connection to a control selector for consecutively energizing said control terminals;
   in which device the improvement comprises:
   said insulating support having a raised platform and a flange which is disposed parallel to said platform and downwardly offset therefrom;
   said contactor winding of at least one of said contactors being topped by the corresponding bridge contact and being carried on said flange;
   said corresponding first and second fixed contact members and said contact elements being mounted directly on said platform.

2. A device as claimed in claim 1, wherein said insulating support comprises an integrally formed skirt interconnecting said platform and said flange, said skirt being perpendicular to both said platform and said flange.

3. A device as claimed in claim 1, wherein said insulating support has a centrally disposed platform and two oppositely extending flanges disposed on opposite sides of said platform.

4. A device as claimed in claim 3, comprising control circuits connected to said control terminals, said insulating support comprising an integrally formed skirt interconnecting said platform and each said flange, said control circuits comprising electronic components received in a space defined below said platform between said skirts.

5. A device as claimed in claim 4, wherein said platform is T-shaped and has a substantially rectangular elongated portion which is perpendicular to the sides of the platform connected to the flanges and which forms the dash of the T.

6. A device as claimed in claim 5, wherein some of said electronic components are received below said elongated portion of said platform.

7. A device as claimed in claim 1, wherein said second contact element comprises a common conductive plate carrying said second fixed contact member of each said contactor and connected to said junction terminal.

8. A device as claimed in claim 7, comprising four contactors and wherein said common conductive plate is H-shaped, the first fixed contact members of two of said contactors being disposed with the corresponding terminals between the arms of the H one on each side of the dash of the H.

9. A device as claimed in claim 7, comprising four contactors and four first contact elements and wherein said common conductive plate is of elongated rectangular shape, wherein said insulating support has a centrally disposed platform and two oppositely extending flanges connected on opposite sides of said platform, the minor sides of said common conductive plate being parallel to the sides of said platform connected to said flanges, two of said first contact elements flanking each major side of said common conductive plate.

10. A device as claimed in claim 7, wherein said connecting terminals are disposed on the same surface of said platform as said first and second fixed contact members of said contactors, said first contact element comprising a conductive connecting plate connecting said first fixed contact member of each said contactor to the corresponding connecting terminal.

11. A device as claimed in claim 10, wherein at least one of said conductive plates connecting said first and second fixed contact members to said junction and connecting terminals includes a narrow conductive portion serving as a fuse.

12. A device as claimed in claim 1, comprising an insulating protective plate spaced apart from said platform and extending parallel to said platform over at least a major portion thereof, said junction and connecting terminals extending from said platform through said insulating protective plate.

13. A device as claimed in claim 12, wherein the surface of said insulating plate from which said connecting and junction terminals extend presents separating ribs for guiding wires connecting said connecting and junction terminals to the retarder winding and to the one pole of the power supply respectively.

14. A device as claimed in claim 12, comprising a limit stop for limiting the movement of said bridge contact of each said contactor, said limit stop being rigidly secured to said insulating protective plate.

15. A device as claimed in claim 1, comprising a control circuit connected to each said control terminal, said control circuit being received below said platform of said insulating support and being connected to the contactor winding of the corresponding contactor through an aperture in said flange of said insulating support.

16. A device as claimed in claim 1, wherein said platform has a fixed multiple connector element whose contacts are the connecting terminals and are adapted to cooperate with the contacts on a movable connector part connected to the control selector.

17. A device as claimed in claim 1, wherein said insulating support is received in a casing, and one of the walls of said casing is formed with a lead-out for a multi-core cable.

* * * * *